US010982870B2

(12) United States Patent
Snider et al.

(10) Patent No.: US 10,982,870 B2
(45) Date of Patent: Apr. 20, 2021

(54) WORKING FLUID DISTRIBUTION SYSTEMS

(71) Applicant: Johnson Controls Technology Company, Auburn Hills, MI (US)

(72) Inventors: Ryan L. Snider, York, PA (US); Nicholas P. Mislak, Bel Air, MD (US); Douglas A. Kester, York, PA (US)

(73) Assignee: Jonhson Controls Technology Company, Auburn Hills, MI (US)

( * ) Notice: Subject to any disclaimer, the term of this patent is extended or adjusted under 35 U.S.C. 154(b) by 194 days.

(21) Appl. No.: 16/137,257

(22) Filed: Sep. 20, 2018

(65) Prior Publication Data
US 2020/0072483 A1 Mar. 5, 2020

Related U.S. Application Data

(60) Provisional application No. 62/725,673, filed on Aug. 31, 2018.

(51) Int. Cl.
| | |
|---|---|
| *F16K 31/04* | (2006.01) |
| *F24F 11/30* | (2018.01) |
| *F25B 39/02* | (2006.01) |
| *F25B 49/02* | (2006.01) |
| *F16K 7/04* | (2006.01) |
| *F24F 11/84* | (2018.01) |
| *F24F 110/10* | (2018.01) |
| *F24F 140/20* | (2018.01) |

(52) U.S. Cl.
CPC ............... *F24F 11/30* (2018.01); *F16K 7/04* (2013.01); *F24F 11/84* (2018.01); *F25B 39/028* (2013.01); *F25B 49/02* (2013.01); *F24F 2110/10* (2018.01); *F24F 2140/20* (2018.01); *F25B 2500/09* (2013.01); *F25B 2600/2515* (2013.01)

(58) Field of Classification Search
CPC ........ F24F 11/30; F24F 11/84; F24F 2110/10; F24F 2140/20; F16K 7/04; F25B 39/028; F25B 49/02; F25B 2500/09; F25B 2600/2515
USPC ................... 137/487.5; 165/175; 251/4, 6, 8
See application file for complete search history.

(56) References Cited

U.S. PATENT DOCUMENTS

| | | | | |
|---|---|---|---|---|
| 2,241,086 A | * | 5/1941 | Gould | F25B 41/06 62/223 |
| 2,558,152 A | * | 6/1951 | Perkins | A01J 7/005 119/14.08 |
| 2,787,138 A | * | 4/1957 | Boyle | F25B 39/028 62/525 |
| 3,329,390 A | * | 7/1967 | Hulsey | F16K 7/08 251/4 |
| 3,468,342 A | * | 9/1969 | Craft | F15C 3/00 137/625.66 |

(Continued)

*Primary Examiner* — Minh Q Le
(74) *Attorney, Agent, or Firm* — Fletcher Yoder, P.C.

(57) ABSTRACT

A working fluid distribution system for a heating, ventilation, and/or air conditioning (HVAC) system includes a distributor tube composed of a flexible material and configured to supply a working fluid to a component of an HVAC circuit of the HVAC system. The fluid distribution system includes an actuator coupled to the distributor tube and configured to be actuated to adjust a geometry of the distributor tube. Additionally, the fluid distribution system includes a controller configured to instruct the actuator to adjust the geometry of the distributor tube based on an operating condition.

22 Claims, 9 Drawing Sheets

(56) References Cited

U.S. PATENT DOCUMENTS

| | | | | |
|---|---|---|---|---|
| 3,685,786 A * | 8/1972 | Woodson | | F16K 47/06 |
| | | | | 251/4 |
| 4,570,822 A * | 2/1986 | Procacino | | B65B 3/36 |
| | | | | 137/487.5 |
| 4,570,898 A * | 2/1986 | Staeubli | | A61M 39/288 |
| | | | | 251/4 |
| 4,593,539 A * | 6/1986 | Humpolik | | F28F 9/027 |
| | | | | 62/504 |
| 7,114,517 B2 * | 10/2006 | Sund | | G01F 1/8413 |
| | | | | 137/487.5 |
| 8,763,424 B1 | 7/2014 | Albertson | | |
| 9,441,868 B1 * | 9/2016 | Barot | | F25B 49/04 |
| 9,506,678 B2 * | 11/2016 | Uselton | | F25B 45/00 |
| 10,520,255 B2 * | 12/2019 | Kester | | F28F 1/124 |
| 2002/0014607 A1 * | 2/2002 | Abromaitis | | F16K 7/04 |
| | | | | 251/7 |
| 2006/0101850 A1 * | 5/2006 | Taras | | F25B 39/028 |
| | | | | 62/515 |
| 2009/0272138 A1 | 11/2009 | Kim | | |
| 2010/0089559 A1 * | 4/2010 | Gorbounov | | F28F 9/028 |
| | | | | 165/174 |
| 2010/0192623 A1 | 8/2010 | Cittadini | | |
| 2010/0252243 A1 * | 10/2010 | Huazhao | | F28F 9/0273 |
| | | | | 165/174 |
| 2012/0216563 A1 | 8/2012 | Braunschweig et al. | | |
| 2013/0023971 A1 | 1/2013 | Smiley | | |
| 2014/0077107 A1 * | 3/2014 | Berwanger | | F16K 7/065 |
| | | | | 251/7 |
| 2014/0123696 A1 * | 5/2014 | Kim | | F28F 9/0265 |
| | | | | 62/498 |
| 2016/0223240 A1 * | 8/2016 | Maeda | | F24F 1/26 |
| 2017/0165468 A1 * | 6/2017 | Nobles | | F16K 7/08 |
| 2017/0292743 A1 * | 10/2017 | Douglas | | F25B 41/04 |
| 2018/0112884 A1 * | 4/2018 | Goryu | | F28F 13/187 |

\* cited by examiner

WORKING FLUID DISTRIBUTION SYSTEMS

CROSS REFERENCE TO RELATED APPLICATION

This application claims priority from and the benefit of U.S. Provisional Application Ser. No. 62/725,673, entitled "WORKING FLUID DISTRIBUTION SYSTEMS," filed Aug. 31, 2018, which is hereby incorporated by reference in its entirety for all purposes.

BACKGROUND

The present disclosure relates generally to fluid distribution systems, and more particularly, to fluid distribution systems for directing fluids in a heating, ventilation, and/or air conditioning (HVAC) system.

HVAC systems are utilized in residential, commercial, and industrial environments to control environmental properties, such as temperature and humidity, for occupants of the respective environments. The HVAC system may control the environmental properties through control of an air flow delivered to the environment and control of a refrigerant flow through the HVAC system. Generally, HVAC systems operate by circulating the refrigerant through a closed circuit between an evaporator where the refrigerant absorbs heat and a condenser where the refrigerant releases heat. The refrigerant flowing within the closed circuit is generally formulated to undergo phase changes within the normal operating temperatures and pressures of the systems so that quantities of heat can be exchanged by virtue of the latent heat of vaporization of the refrigerant to provide conditioned air to the respective environments.

In some cases, the HVAC system includes a distributor to deliver a portion of the refrigerant to each flow path of multiple flow paths within the evaporator. The flow paths may be formed by coils or heat exchange tubes, which enable the refrigerant to exchange heat with the air flow directed over the evaporator. Unfortunately, each coil may receive or contact a different amount of the air flow, or the refrigerant may flow differently within each coil or flow path, such that portions of the refrigerant within one coil exchange more or less heat with the air flow than portions of the refrigerant within other coils. The uneven air flow and/or the uneven refrigerant flow may lead to under-heating or superheating of portions of the refrigerant within the evaporator, reducing an operating efficiency of the HVAC system.

SUMMARY

In one embodiment of the present disclosure, a working fluid distribution system for a heating, ventilation, and/or air conditioning (HVAC) system includes a distributor tube composed of a flexible material and configured to supply a working fluid to a component of an HVAC circuit of the HVAC system. The fluid distribution system includes an actuator coupled to the distributor tube and configured to be actuated to adjust a geometry of the distributor tube. Additionally, the fluid distribution system includes a controller configured to instruct the actuator to adjust the geometry of the distributor tube based on an operating condition.

In another embodiment of the present disclosure, a fluid distribution system includes a first flexible distributor tube configured to provide a first portion of a fluid receiving system with a first flow of a fluid. The fluid distribution system also includes a second flexible distributor tube configured to provide a second portion of the fluid receiving system with a second flow of the fluid. Additionally, the fluid distribution system includes an actuator system coupled to the first flexible distributor tube and the second flexible distributor tube. The actuator system is configured to be actuated to adjust a first geometry of the first flexible distributor tube, to adjust a second geometry of the second distributor tube, or both. The fluid distribution system includes a controller configured to instruct the actuator system to adjust the first geometry of the first flexible distributor tube, to instruct the actuator system to adjust the second geometry of the second flexible distributor tube, or both in response to a determination that an operating condition of the fluid distribution system or the fluid receiving system is beyond an operating condition threshold.

In a further embodiment of the present disclosure, a refrigerant distribution system for a heating, ventilation, and/or air conditioning (HVAC) system includes a distributor tube composed of a flexible material. The distributor tube is configured to provide a flow of a refrigerant to a heat exchanger of the HVAC system. The fluid distribution system includes an actuator coupled to the distributor tube and configured to be actuated to adjust a geometry of the distributor tube. Additionally, the fluid distribution system includes a controller configured to instruct the actuator to adjust the geometry of the distributor tube based on an operating condition of the HVAC system.

Other features and advantages of the present application will be apparent from the following, more detailed description of the embodiments, taken in conjunction with the accompanying drawings which illustrate, by way of example, the principles of the application.

DETAILED DESCRIPTION

Figure 1:
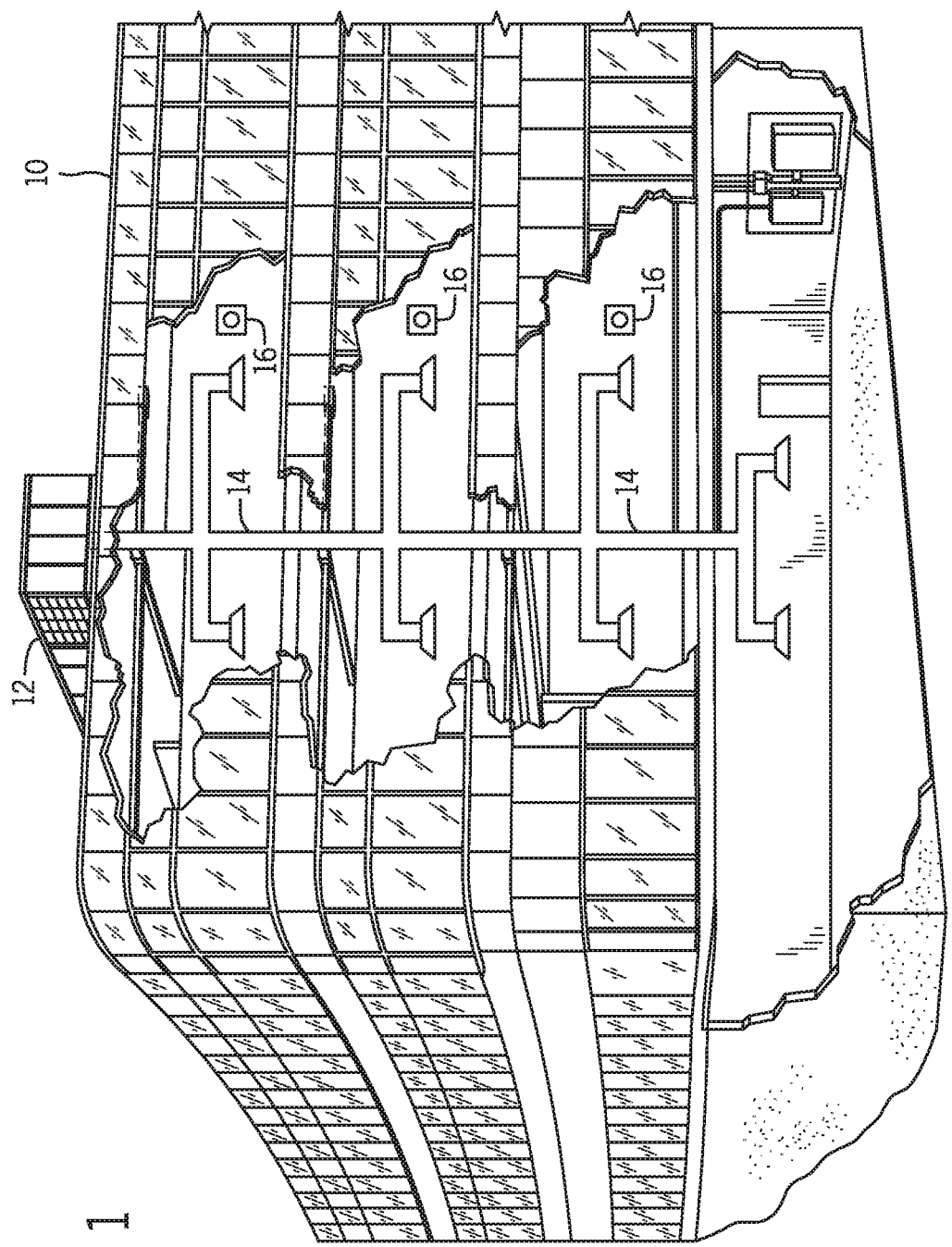
FIG. 1 is a perspective view of an embodiment of a commercial or industrial HVAC system, in accordance with an aspect of the present disclosure.

The present disclosure is directed to a fluid distribution system for directing fluid to a fluid receiving system. As discussed herein, the fluid distribution system is primarily discussed with reference to controlling refrigerant flow to an evaporator of an HVAC system. However, it is to be understood that the fluid distribution system may be adapted for any suitable system that receives one or multiple flows of a fluid, including power generation systems having engines that receive fuel from a fuel supply, irrigation systems having emitting devices, such as sprinklers or drip emitters that receive water from a water supply, and so forth. The fluid distribution system may include a distributor coupled between a fluid supply and a fluid receiving system. For example, the distributor may have a body that receives the fluid from the fluid supply and a number of flexible feeder tubes extending from the body that each receive a portion of the fluid. An actuator of the fluid distribution system may be coupled to each flexible feeder tube, where the actuator is configured to enable the fluid distribution system to selectively adjust a geometry of each flexible feeder tube. For example, the actuator may include a motor coupled between clamps that are attached to each flexible feeder tube, a linear actuator coupled to a cable that extends through a pulley and is coupled to each flexible feeder tube, and so forth. Based on a force applied by the actuator, the flexible feeder tubes may each adjust in shape and/or orientation to modify the corresponding flow path of the fluid within each flexible feeder tube.

In this manner, the fluid distribution system may modify each flexible feeder tube to adjust and improve distribution of fluid within the evaporator or other fluid receiving system. Indeed, a controller communicatively coupled to the actuator may receive feedback from one or multiple sensors of the fluid receiving system and/or fluid distribution system indicative of a pressure drop or other suitable operating parameter. Then, in response to a determination that one portion of the fluid receiving system is receiving more refrigerant than another portion, or any other suitable indication of uneven or undesirable flows of fluid or air, the controller may instruct the actuator to modify the shape and/or orientation of one or more of the flexible feeder tubes to equalize the fluid flow of the feeder tubes. Additionally, it is to be understood that the flexible feeder tubes of the fluid distribution system may be manually adjusted in some embodiments to adjust or improve the fluid flow therethrough. The flexible feeder tubes may be made of a flexible material and/or may include corrugations, telescoping elements, or other moveable or compressible components that enable the flexible feeder tubes to be lengthened, shortened, expanded, contracted, bent, or otherwise adjusted in shape and/or geometry. Accordingly, as discussed in more detail below, the fluid distribution system may adjust the flow paths of refrigerant or other fluid through the flexible feeder tubes and heat exchange coils coupled thereto to reduce superheating and/or subcooling of the refrigerant, thereby improving operation of the HVAC system.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
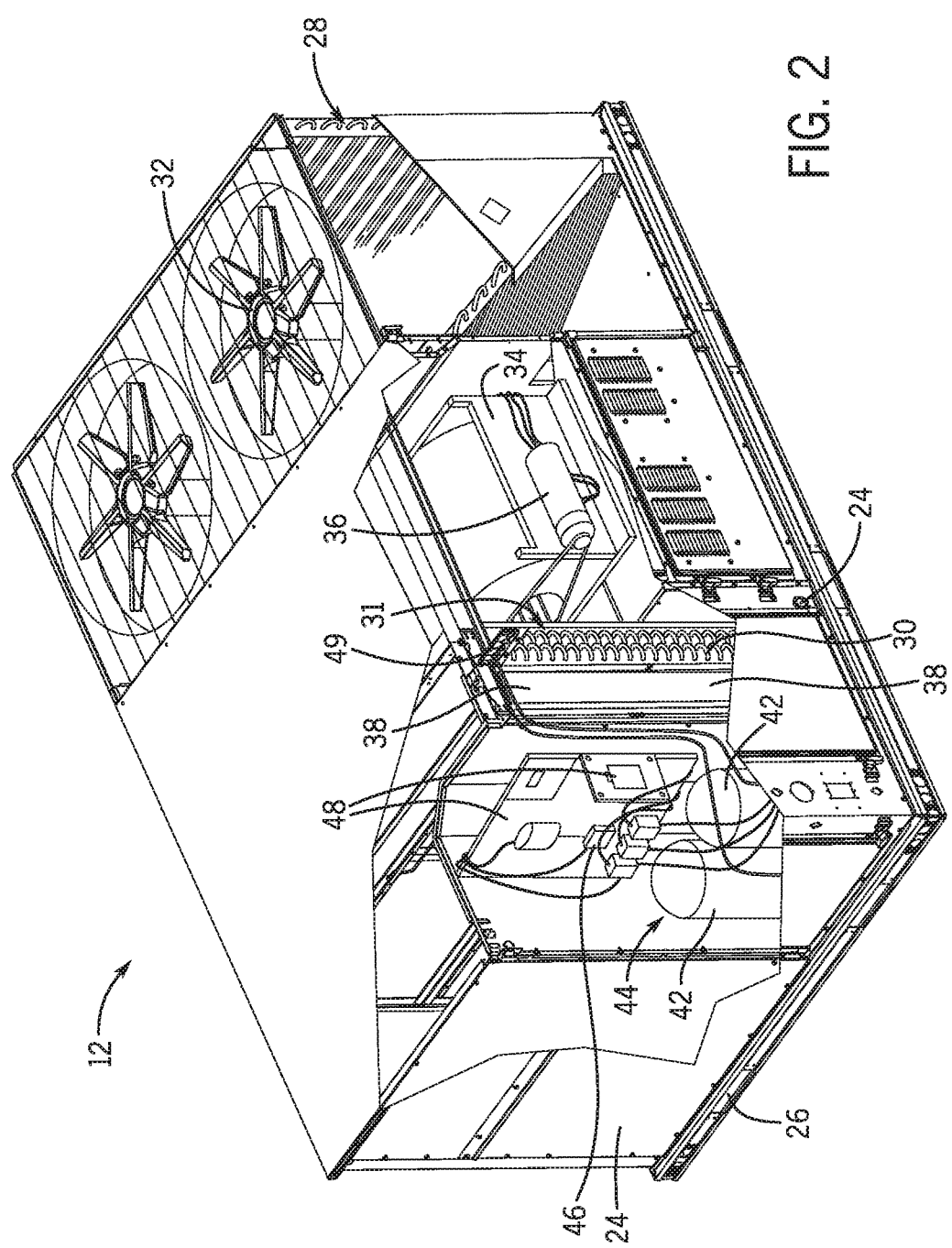
FIG. 2 is a perspective cutaway view of an embodiment of a packaged unit of an HVAC system, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
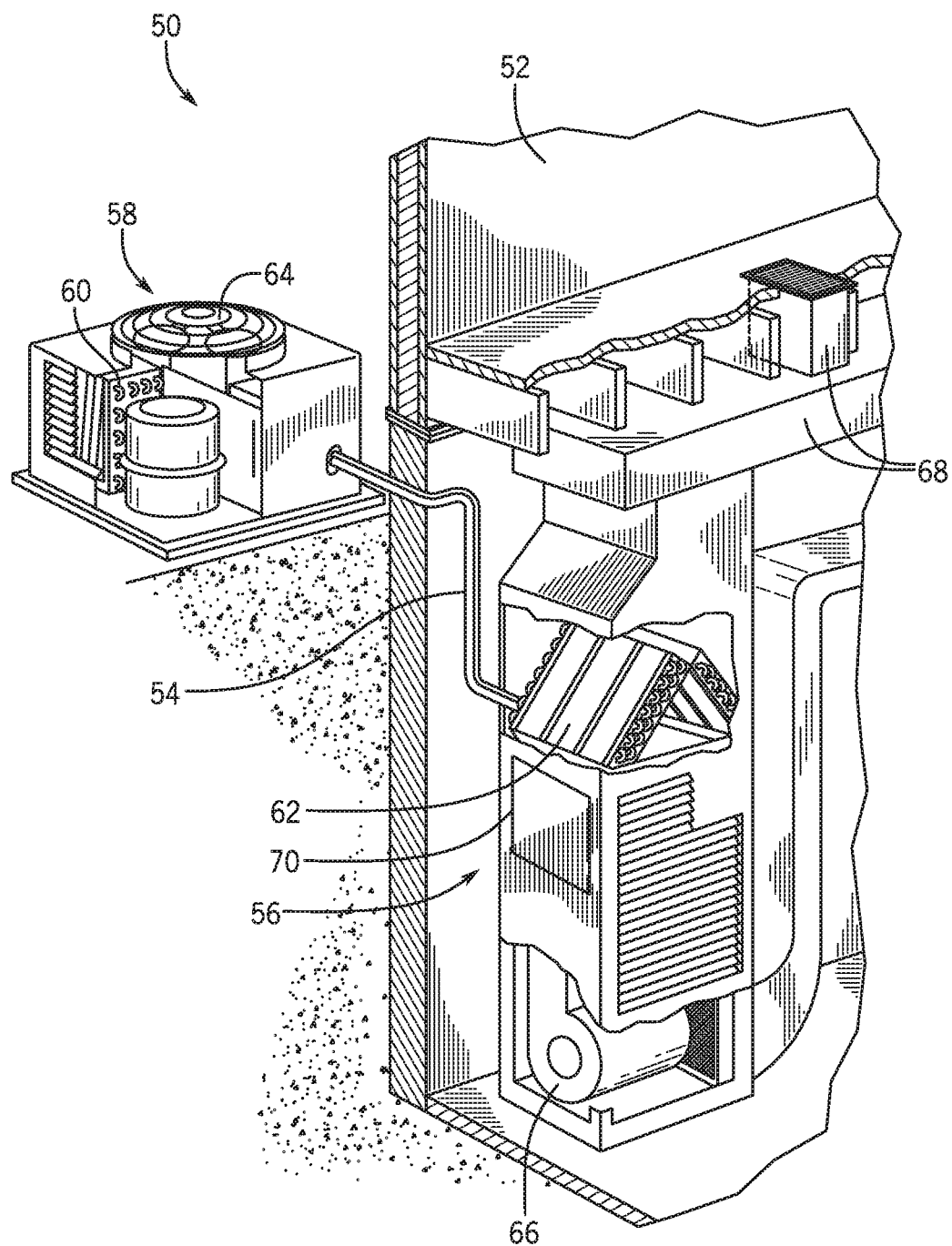
FIG. 3 is a perspective cutaway view of an embodiment of a split system of an HVAC system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or a set point plus a small amount, the residential heating and cooling system 50 may become operative to refrigerate additional air for circulation through the residence 52. When the temperature reaches the set point, or a set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
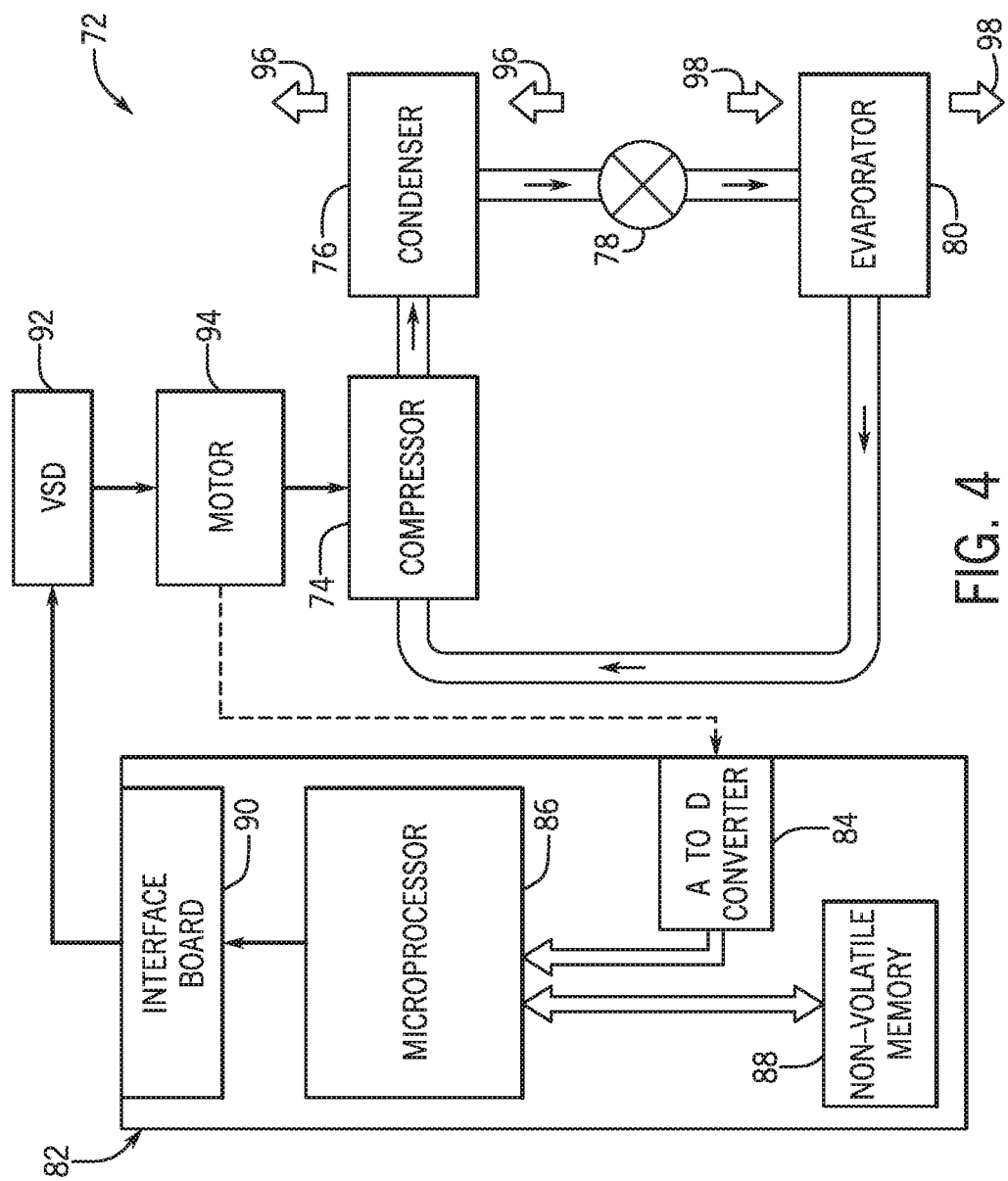
FIG. 4 is a schematic diagram of an embodiment of a vapor compression system of an HVAC system, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

Figure 5:
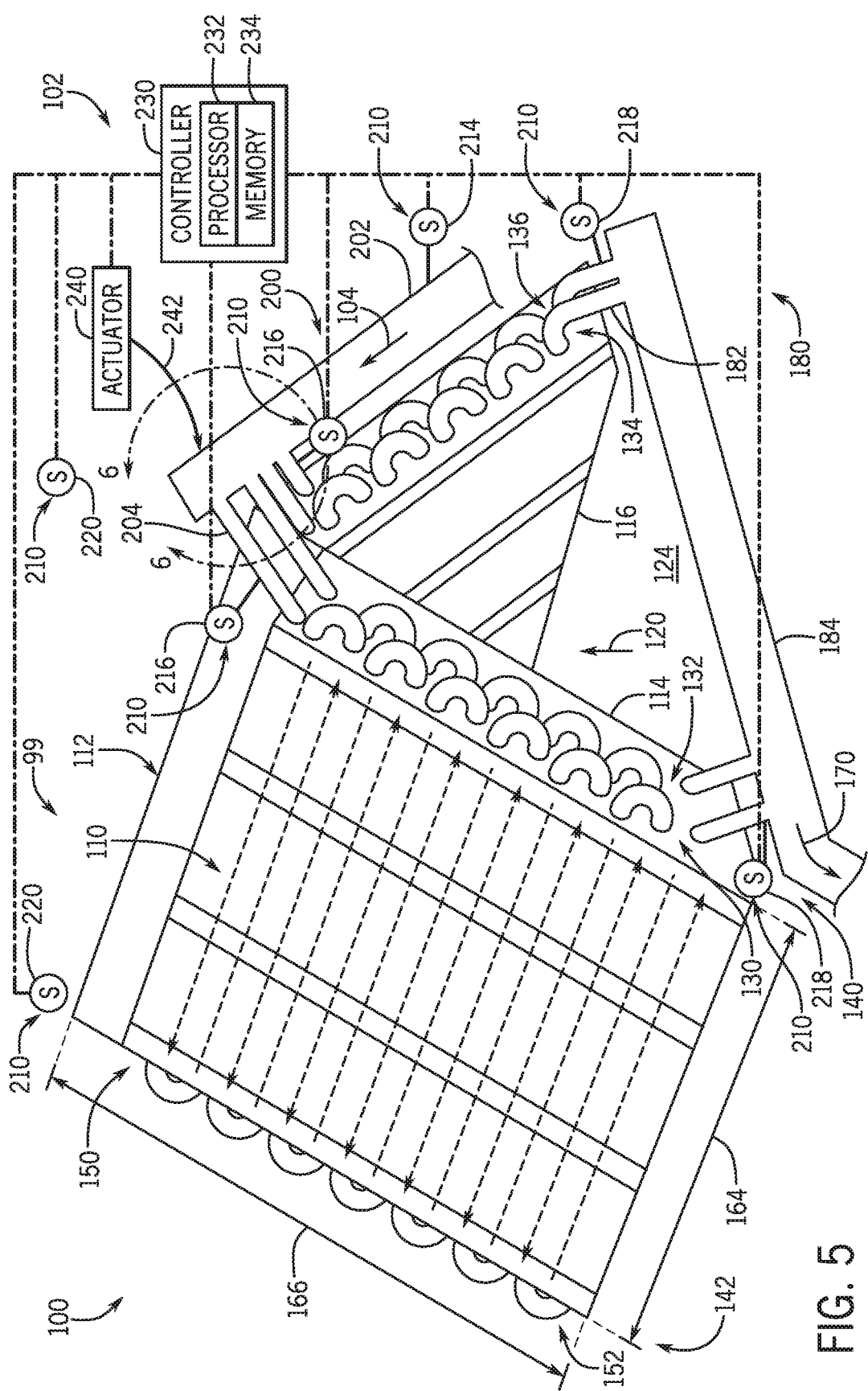
FIG. 5 is a perspective view of an embodiment of a heat exchanger having a fluid distribution system, in accordance with an aspect of the present disclosure.

As set forth above, embodiments of the present disclosure are directed to a fluid distribution system for directing a fluid to a fluid receiving system, such as for directing a refrigerant to the heat exchanger 62. The fluid distribution system may include a distributor having flexible feeder tubes that may be individually positioned, shaped, and/or oriented to supply the refrigerant to a number of flow paths within the heat exchanger 62 at individually-configured flow rates. The fluid distribution system may be employed within any suitable HVAC system, such as the HVAC unit 12, the residential heating and cooling system 50, and/or the vapor compression system 72, any of which may be referred to as an HVAC system. For instance, FIG. 5 is a perspective view of a heat exchanger 99 of an HVAC system 100 having a fluid distribution system 102 or working fluid distribution system. Indeed, as similarly discussed above, the heat exchanger 99 may operate as an evaporator when the HVAC system 100 is operating as an air conditioner, and the heat exchanger 99 may operate as a condenser when the HVAC system 100 is operating as a heat pump. Additionally, the heat exchanger 99 receives and directs one or multiple flows of a refrigerant 104, or working fluid, therein. It should be appreciated that the heat exchanger 99 may be any of the heat exchangers discussed above or any other suitable heat exchanger configured to receive a working fluid flow.

As shown, the heat exchanger 99 includes multiple coil passes 110 disposed within a frame 112. The frame 112 is an A-shaped frame, but other suitably shaped frames, such as M-shaped frames, N-shaped frames, among others, may be employed with the techniques disclosed herein. In some embodiments, the frame 112 includes sheets or fins that retain the multiple coil passes 110 in an operating position. Additionally, the frame 112 may include a first frame portion 114 coupled to a second frame portion 116. The first and second frame portions 114, 116 may be angled relative to one another, such that an air flow 120 may be drawn through an open space 124 within the first and second frame portions 114, 116 and across the multiple coil passes 110. The air flow 120 may be drawn or pushed along one or more corresponding air flow paths through and/or across the coil passes 110. In some embodiments, the heat exchanger 99 may be oriented in another direction, such that down flow or side flow configurations, instead of the illustrated up flow configuration, are achieved.

Looking to more details of the flow of the refrigerant 104 within the heat exchanger 99, the coil passes 110 may be divided between multiple parallel circuits. For example, the heat exchanger 99 of the present embodiment includes two parallel circuits for each frame portion 114, 116. That is, a first parallel circuit 130 may extend along an outer portion of the first frame portion 114 and a second parallel circuit 132 may extend along an inner portion of the first frame portion 114. Additionally, a third parallel circuit 134 may extend along an inner portion of the second frame portion 116, and a fourth parallel circuit 136 may extend along an outer portion of the second frame portion 116. The inner portions of the frame portions 114, 116 face toward one another, while the outer portions of the frame portions 114, 116 face away from one another. Each parallel circuit 130, 132, 134, 136 may wind back and forth within the heat exchanger 99. For example, the parallel circuits 130, 132, 134, 136 may include the multiple coil passes 110 that extend from a first longitudinal end 140 of the heat exchanger 99 to a second longitudinal end 142 of the heat exchanger 99 and from an upper end 150 of the heat exchanger 99 to a lower end 152 of the heat exchanger 99. By winding through a length 164 defined between the longitudinal ends 140, 142 and a height 166 or slanted height of the heat exchanger 99 defined between the ends 150, 152 of the heat exchanger 99, the parallel circuits 130, 132, 134, 136 provide heat transfer surface area to enable the refrigerant 104 to exchange heat with the air flow 120 traveling across the heat exchanger 99. The heat exchanger 99 may include any suitable number of parallel circuits, such as one, two, three, four, five, six, seven, eight, or more parallel circuits extending therethrough.

After the refrigerant 104 has traveled through the multiple coil passes 110 and exchanged heat with the air flow 120, spent refrigerant 170 exits the multiple coil passes 110 via a header manifold 180. The spent refrigerant 170 from each parallel circuit 130, 132, 134, 136 may flow into a respective header manifold tube 182 and then into a main header manifold tube 184 of the header manifold 180. That is, each header manifold tube 182 may be fluidly coupled to the main header manifold tube 184, which receives the spent refrigerant 170 and directs the spent refrigerant 170 to the next portion of the refrigeration cycle, where the spent refrigerant 170 is recharged.

Looking to more details of the refrigerant distribution within the heat exchanger 99, to deliver refrigerant 104 to each parallel circuit 130, 132, 134, 136, the fluid distribution system 102 includes a distributor 200. For example, the distributor 200 may be coupled between an expansion device, such as the expansion device 78 of FIG. 4, and the heat exchanger 99. The distributor 200 includes a main distributor tube 202 or a main body and feeder tubes 204 or distributor tubes that are each coupled between the main distributor tube 202 and one of the parallel circuits 130, 132, 134, 136 of the heat exchanger 99. Thus, the refrigerant 104 may be distributed from the main distributor tube 202 to each parallel circuit 130, 132, 134, 136. The refrigerant 104 may also be supplied to the distributor 200 at sufficient pressure to ensure a flow of the refrigerant 104 in the multiple coil passes 110 travels completely therethrough. However, in some conditions, the air flow 120 across the heat exchanger 99 may be uneven and/or the flow of the refrigerant 104 though one or more parallel circuits 130, 132, 134, 136 may be different than the flow of the refrigerant 104 through another parallel circuit 130, 132, 134, 136, such that one portion of refrigerant 104 within the heat exchanger 99 exchanges more heat with the air flow 120 than another portion of the refrigerant 104.

To decrease relative inequalities in the distribution of heat within the refrigerant 104 passing through the heat exchanger 99, the fluid distribution system 102 may individually adjust one or multiple feeder tubes 204 of the distributor 200. For example and as discussed in more detail with reference to FIGS. 6-11, the feeder tubes 204 may be flexible, expandable, and/or moveable tubular components that are selectively adjustable in shape and/or orientation to modify a flow of the refrigerant 104 through each feeder tube 204. Indeed, by adjusting a position or geometry of the feeder tubes 204, the flow of the refrigerant 104 through each feeder tube 204 and into the corresponding parallel circuit 130, 132, 134, 136 may be increased or decreased relative to the flow of the refrigerant 104 through the other feeder tubes 204.

For example, by increasing an inner diameter and/or reducing a length of one feeder tube 204, a pressure drop through the feeder tube 204 may be decreased, thereby facilitating a greater flow of the refrigerant 104 from the main distributor tube 202, through the feeder tube 204, and into the parallel circuit 130, 132, 134, 136 coupled to the feeder tube 204. Accordingly, the fluid distribution system 102 may modify the relative flowrates of the refrigerant 104 within each feeder tube 204 to adjust the relative flowrates of the refrigerant 104 within each parallel circuit 130, 132, 134, 136. Because the air flow 120 over each parallel circuit 130, 132, 134, 136 may not be identical in some embodiments of the heat exchanger 99, such modifications to the flowrates of the refrigerant 104 may enable the fluid distribution system 102 to match or correlate the flowrates of the refrigerant 104 with respective portions of the air flow 120 over the parallel circuits 130, 132, 134, 136. For example, if one parallel circuit 130, 132, 134, 136 receives a greater portion of the air flow 120 than another parallel circuit 130, 132, 134, 136 under certain operating conditions, the fluid distribution system 102 enables the feeder tube 204 corresponding to the one parallel circuit 130, 132, 134, 136 to be modified or dynamically modified in shape and/or orientation, also referred to herein as a geometry. In this manner, a greater flow of the refrigerant 104 within the one parallel circuit 130, 132, 134, 136 is enabled and facilitated, thereby increasing the operating efficiency of the heat exchanger 99.

To facilitate determination of a target geometry of the feeder tubes 204, such as a target shape and/or a target orientation, the fluid distribution system 102 may include one or multiple sensors 210. The sensors 210 may be any suitable sensors that enable the fluid distribution system 102 to monitor any suitable operating parameters of the HVAC system 100 and/or the fluid distribution system 102. For example, the operating parameters sensed by the sensors 210 may include flow rates, pressures, temperatures, and so forth of the refrigerant 104 and/or the air flow 120. As such, the sensors 210 may be any suitable sensors for monitoring parameters of the air flow 120 and/or the refrigerant 104 of the heat exchanger 99 directly or indirectly, such as flowrate sensors, pressure sensors, temperature sensors, and so forth. Moreover, as used herein, the term "sensor" may include any suitable instrument capable of acquiring feedback through direct or indirect observation indicators.

More particularly, the illustrated embodiment of the fluid distribution system 102 includes the sensors 210 for monitoring the refrigerant 104 traveling through each parallel circuit 130, 132, 134, 136 of the heat exchanger 99. For example, the sensors 210 may include a main distributor tube sensor 214 coupled to the main distributor tube 202 for monitoring a parameter of the refrigerant 104 within the main distributor tube 202, one or multiple feeder tube sensors 216 each coupled to one or more of the feeder tubes 204 for monitoring a parameter of the refrigerant 104 within the respective feeder tube 204, one or multiple header manifold tube sensors 218, each coupled to one of the header manifold tubes 182, for monitoring a parameter of the refrigerant 104 within the corresponding header manifold tubes 182, and so forth. Additionally, the sensors 210 may include one or multiple airflow sensors 220 for monitoring parameters of the air flow 120 or respective portions of the air flow 120 across the heat exchanger 99.

The sensors 210 may be communicatively coupled to a controller 230 of the fluid distribution system 102, such as the control panel 82 discussed above or a separate controller of the fluid distribution system 102 communicatively coupled to the control panel 82. As such, the sensors 210 may transmit signals indicative of the operating parameters of the HVAC system 100 and/or the fluid distribution system 102 to the controller 230. The controller 230 of the fluid distribution system 102 may include a processor 232, such as the microprocessor 86 discussed above, and a memory 234, such as the non-volatile memory 88 discussed above, to enable the controller 230 to analyze the operating parameters of the fluid distribution system 102, the heat exchanger 99, and/or the HVAC system 100. Accordingly, based on the signals transmitted from the sensors 210, the controller 230 may determine the operating parameters of the air flow 120 and the flows of the refrigerant 104 within the HVAC system 100.

By way of an example of operating parameters or operating conditions that may be determined based on feedback from the sensors 210, the controller 230 may determine, based on input from the airflow sensors 220, that the air flow 120, such as the air flow rate, at the first frame portion 114 of the heat exchanger 99 is greater than the air flow 120 at the second frame portion 116 of the heat exchanger 99. The controller 230 may further determine, based on input from the header manifold tube sensors 218, that the refrigerant 104 is exiting the first frame portion 114 of the heat exchanger 99 and the second frame portion 116 of the heat exchanger 99 at a same or similar flowrate, such as at flowrates that are within five percent of one another. In some embodiments, the controller 230 may determine that the refrigerant 104 exiting the first frame portion 114 of the heat exchanger 99 has a higher temperature than the temperature of the refrigerant 104 exiting the second frame portion 116 of the heat exchanger 99, or that the refrigerant 104 exiting either frame portion 114, 116 is superheated. Indeed, the operating parameters of the fluid distribution system 102 and/or the HVAC system 100 may be any suitable parameters of the refrigerant 104 and/or the air flow 120, such as a pressure drop, a pressure, a velocity, a temperature, and so forth.

Based on one or multiple operating conditions of the fluid distribution system 102, the HVAC system 100, or both, the controller 230 may determine whether an adjustment to a geometry of one or multiple feeder tubes 204 is expected to improve operation of the HVAC system 100. In some embodiments, the controller 230 determines whether an adjustment to the geometry of the feeder tubes 204 should be made based on a determination that an operating condition is outside of or beyond an operating condition threshold. By way of a non-limiting example with reference to the operating condition including a pressure drop, the operating condition threshold may be a pressure drop threshold that defines an expected range of the pressure drop of the refrigerant 104 through each feeder tube 204 or through each header manifold tube 182. The expected range may be set around an absolute value in some embodiments, such as 1 pressure per square inch (PSI), 2 psi, 3 psi, 5 psi, 10 psi, and so forth. In some embodiments, the expected range may be a range individually set around a respective value for each feeder tube 204, such as the pressure drop through another feeder tube 204, to enable the fluid distribution system 102 to equilibrate the pressure drop through each feeder tube 204. However, in some embodiments, in which certain feeder tubes 204 provide the refrigerant 104 to parallel circuits 130, 132, 134, 136 that regularly receive a greater portion of the air flow 120 than other parallel circuits 130, 132, 134, 136, the expected range set for the pressure drop through the certain feeder tubes 204 may be set as a lower range than a range set for the other feeder tubes 204, such that a greater flow of the refrigerant 104 is directed through the certain feeder tubes 204. In this or any other suitable manner, feedback control of the refrigerant 104 flowing through the feeder tubes 204 may be provided.

In some embodiments, the controller 230 may modify or select an operating condition threshold for each operating condition or operating state of each feeder tube 204 of the HVAC system 100. For example, if a first portion of the feeder tubes 204 receives a greater amount of the air flow 120 than a second portion of the feeder tubes 204 during a first operating state, such as a low operating load having a first fan speed, the fluid distribution system 102 may direct a greater flow of the refrigerant 104 to the first portion of the feeder tubes 204 during the first operating state. Then, if the second portion of the feeder tubes 204 receives a greater amount of the air flow 120 than the first portion of the feeder tubes 204 during a second operating state, such as a high operating load having a second fan speed that faster than the first fan speed, the fluid distribution system 102 may direct a greater flow of the refrigerant 104 to the second portion of the feeder tubes 204 during the second operating state. In such cases, the fluid distribution system 102 enables the feeder tubes 204 to adapt distribution of the refrigerant 102 throughout the heat exchanger 99 for various operating states of the HVAC system 100.

To modify the flows of the refrigerant 104 within the feeder tubes 204, the fluid distribution system 102 may adjust the geometry of one or more of the feeder tubes 204, including the shape, orientation, and/or position of the feeder tubes 204, in any suitable manner. For example, in some embodiments, the feeder tubes 204 of the fluid distribution system 102 may be manually adjusted by a technician or operator to modify the flows of the refrigerant 104 within the parallel circuits 130, 132, 134, 136 of the heat exchanger 99. For example, based on a determination made by the controller 230 and/or the technician, the technician may modify a shape and/or orientation of one or multiple feeder tubes 204, thereby adjusting the flow of the refrigerant 104 therein to increase an operating efficiency of the heat exchanger 99. The feeder tubes 204 may be selectively changeable in shape and orientation and may include retaining features such that any feeder tubes 204 having modified shapes and/or orientations are retained in their modified operating positions.

In some embodiments, the controller 230 may generate a visual, graphical, and/or numerical representation of the operating parameters and transmit the representation to a computing device associated with the technician. As such, the fluid distribution system 102 may further enhance an efficiency of the technician to modify a geometry of one or multiple of the feeder tubes 204 for improving operation of the heat exchanger 99. For example, the technician may modify the shape and/or orientation of the feeder tubes 204 to direct a first flow of the refrigerant 104 along the parallel circuits 130, 132 of the first frame portion 114 of the heat exchanger 99 that is greater than a second flow of the refrigerant 104 along the parallel circuits 134, 136 of the second frame portion 116 of the heat exchanger 99. Such a modification may be made by restricting the flows of the refrigerant 104 through the second frame portion 116 of the heat exchanger 99 via increasing a pressure drop through the feeder tubes 204 coupled to the parallel circuits 134, 136 of the second frame portion 116 of the heat exchanger 99 and/or by derestricting flows of the refrigerant 104 through the first frame portion 114 of the heat exchanger 99 via decreasing a pressure drop through the feeder tubes 204 coupled to the parallel circuits 130, 132 of the first frame portion 114 of the heat exchanger 99. Moreover, although the fluid distribution system 102 is generally discussed herein with reference to modifying the flows of the refrigerant 104 provided to each parallel circuit 130, 132, 134, 136, it is to be understood that the fluid distribution system 102 may additionally or alternatively adjust the flows of the refrigerant 104 out of each parallel circuit 130, 132, 134, 136 by adjusting a respective geometry of one or multiple of the header manifold tubes 182. In such embodiments, the geometry of the header manifold tubes 182 may be manually adjusted, automatically adjusted, or both in a similar manner to the adjustments of feeder tubes described herein.

The fluid distribution system 102 may also be implemented during a product development phase of the heat exchanger 99, such that the distributor 200 having the flexible feeder tubes 204 is analyzed on a test bench to determine desirable and/or functional positions of the feeder tubes 204 that deliver appropriate amounts of refrigerant 104 to each parallel circuit 130, 132, 134, 136. Then, other heat exchangers may be manufactured with rigid or traditional flexible feeder tubes that have a common shape and/or orientation as the test feeder tubes, thus providing an improved array of refrigerant flowrates to each parallel circuit of the other heat exchangers.

In addition or in alternative to manual adjustments, the fluid distribution system 102 may include an actuator 240 or actuator system communicatively coupled to the controller 230 to actuate or automatically actuate the feeder tubes 204 based on instruction from the controller 230. For example, the actuator 240 may be any suitable mechanical and/or physical component directly or indirectly coupled to one or multiple feeder tubes 204 that is able to apply a force 242 to cause the feeder tubes 204 to adjust in shape and/or orientation based on a control signal received from the controller 230. For example, the actuator 240 may be a linear actuator or piston, a motor, a servo motor, and so forth. In some embodiments, the actuator 240 may include a linear actuator that releases or contracts a line, such as a cable, rope, cord, or chain, that extends between the linear actuator and the feeder tube 204, such that movement of the line adjusts the shape and/or orientation of the feeder tube 204. This embodiment and further embodiments of the fluid distribution system 102 for mechanically actuating adjustment of the geometry of the feeder tubes 204 to modify the flows of the refrigerant 104 therein are discussed below with reference to FIGS. 6-11. Thereafter, other embodiments of the fluid distribution system 102 applicable to other fluid receiving systems are discussed with reference to FIGS. 12 and 13. Accordingly, compared to traditional, static refrigerant distributors, the distributor 200 of the fluid distribution system 102 may improve an operating efficiency of the heat exchanger 99 and the HVAC system 100 by selectively adjusting refrigerant flows within the parallel circuit 130, 132, 134, 136 to reduce temperature differentials and/or thermal maldistribution within the refrigerant 104 of the heat exchanger 99.

Figure 6:
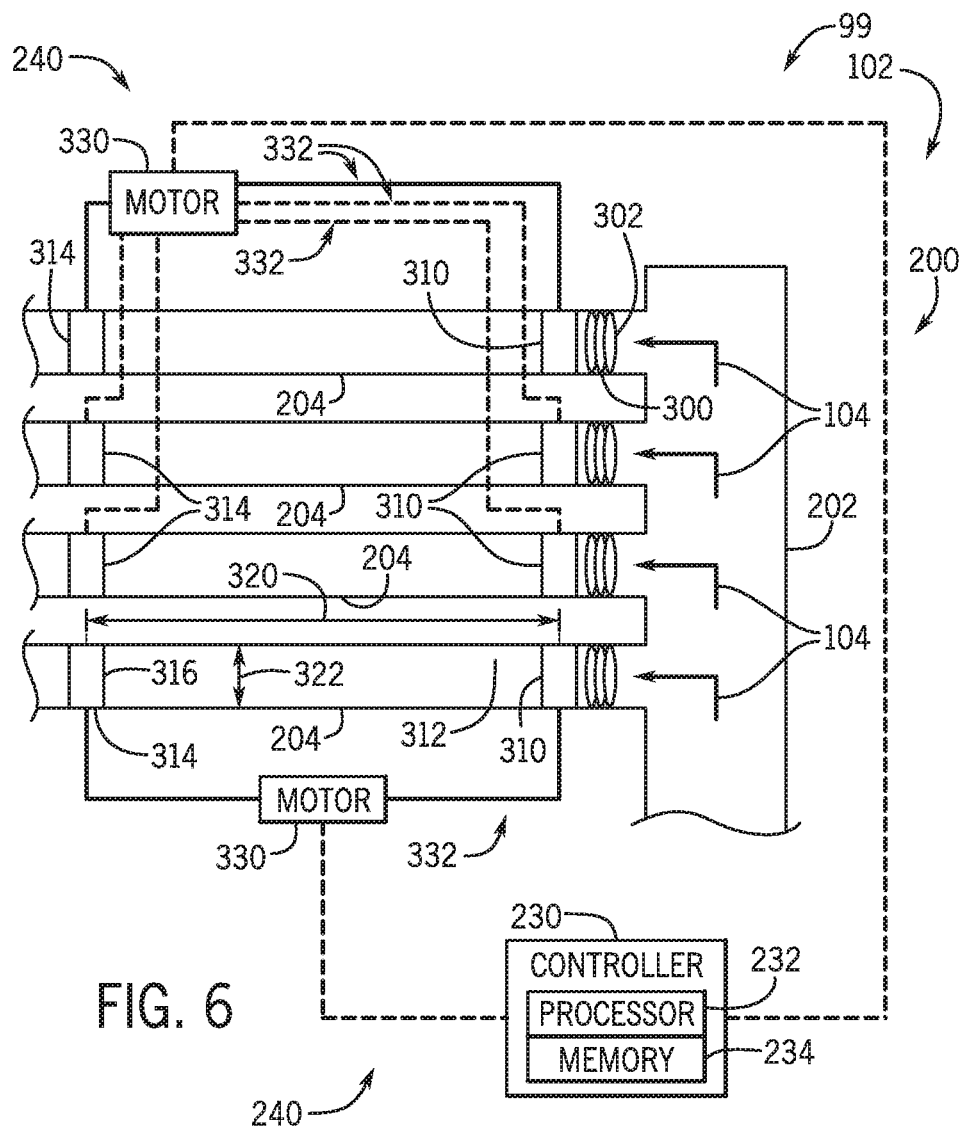
FIG. 6 is a schematic diagram of a distributor of the fluid distribution system, taken along the 6-6 line in FIG. 5, in accordance with an aspect of the present disclosure.

Looking to more details of the fluid distribution system 102, FIG. 6 is a schematic view of the distributor 200 of the fluid distribution system 102, taken along line 6-6 of FIG. 5. As discussed above, the distributor 200 supplies the refrigerant 104 through the main distributor tube 202 and into each feeder tube 204, which each direct a portion of the refrigerant 104 to a respective parallel circuit 130, 132, 134, 136 of the heat exchanger 99. Moreover, the fluid distribution system 102 includes the controller 230, which may determine a target geometry or operating configuration for each feeder tube 204 based on feedback from the sensors 210 of FIG. 5. Additionally, the feeder tubes 204 of the fluid distribution system 102 may be flexible, bendable, and/or stretchable. For example, all or a portion of the feeder tubes 204 may be formed from a flexible material, such as rubber, elastic, plastic, polymers such as polyvinyl chloride, and the like, and/or the feeder tubes 204 may be formed of an inflexible material in a moveable or flexible arrangement or shape, such as braided or woven metal, corrugations, telescoping tube portions, and so forth, as discussed in more detail below.

Additionally, each feeder tube 204 may include one or more threaded portions 300 that are coupled to corresponding threaded portions 302 of the main distributor tube 202. As such, each feeder tube 204 may be reversibly removed from the main distributor tube 202 to enable testing of the heat exchanger 99 with other feeder tubes, to facilitate servicing of the heat exchanger 99, to enable replacement of the feeder tubes 204, and so forth. However, it is to be understood that the feeder tubes 204 or a flexible portion of the feeder tubes 204 may be coupled within the distributor 200 in any suitable manner, such as welding, brazing, epoxy, snap-in connections, retainer rings, and so forth.

To facilitate adjustment of the shape, geometry, and/or orientation of the feeder tubes 204, the fluid distribution system 102 may include any suitable device or system for applying force to all or a portion of the feeder tube 204 and/or for retaining all or a portion of the feeder tube 204 in place. For example, the illustrated fluid distribution system 102 includes, for each feeder tube 204, a first clamp 310 coupled to a first surface 312 of the respective feeder tube 204 and a second clamp 314 coupled to a second surface 316 of the respective feeder tube 204. In the present embodiment in which each feeder tube 204 is in an un-stretched state, the first and second clamps 310, 314 are separated by an un-stretched tube separation length 320, and a diameter of each feeder tube 204 between the two clamps 310, 314 is an un-stretched tube diameter 322. The clamps 310, 314 may each be any suitable clamping device or retaining device that is capable of being coupled to the feeder tube 204.

To cause the clamps 310, 314 to move relative to one another and thereby adjust the geometry of the respective feeder tube 204, the fluid distribution system 102 may include an actuator 240 coupled between the clamps 310, 314. One actuator 240 may be coupled to one or multiple feeder tubes 204. For example, the actuator 240 of the illustrated fluid distribution system 102 includes a motor 330 coupled to the second clamp 314 of one feeder tube 204, and a telescoping arm 332, drive arm, or beam between the first clamp 310 and the motor 330 of the one feeder tube 204. Although discussed herein as a telescoping arm 332, it is to be understood that the actuator 240 may include any suitable drive arm capable of enabling the motor 330 to move the first clamp 310 relative to the second clamp 314. Additionally, the fluid distribution system 102 includes another actuator 240 coupled to the remaining feeder tubes 204, such that respective first clamps 310, second clamps 314, and telescoping arms 332 are coupled to each feeder tube 204. The actuator 240 of the multiple feeder tubes 204 may include one motor 330 to actuate the telescoping arms 332 of the multiple feeder tubes 204. The clamps 310, 314, the motor 330, and the telescoping arm 332 may be coupled together by any suitable process or component, including welding, epoxy, adhesives, fasteners, and so forth. Moreover, any suitable number of actuators 240 may be used to control and adjust the geometry of any suitable number of feeder tubes 204. Indeed, in some embodiments, the fluid distribution system 102 may actively control the geometry of one feeder tube 204, or another suitable fraction or portion of the feeder tubes 204, such that the relative flows of the refrigerant 104 through the controlled feeder tubes 204 compared to static, unactuated feeder tubes 204 may be adjusted.

As illustrated, the controller 230 is communicatively coupled to the actuator 240, which, in the present embodiment, is the motor 330. Thus, based on actuation by the controller 230, the motor 330 may elongate the telescoping arm 332, thereby pushing the second clamp 314 away from the motor 330 and stretching the portion of the feeder tube 204 between the clamps 310, 314, as discussed below with reference to FIG. 7. In other words, the first clamp 310 may be stationary in the present embodiment, while the motor 330 adjusts a position of the second clamp 314. Additionally, in some embodiments, the actuator 240 may exclude a motor or drive link and may instead include a lockable telescoping arm coupled between the first and second clamps 310, 314 to enable the technician to manually adjust and retain each feeder tube 204 having the first and second clamps 310, 314 and the lockable telescoping arm coupled thereto in a desired geometry.

Figure 7:
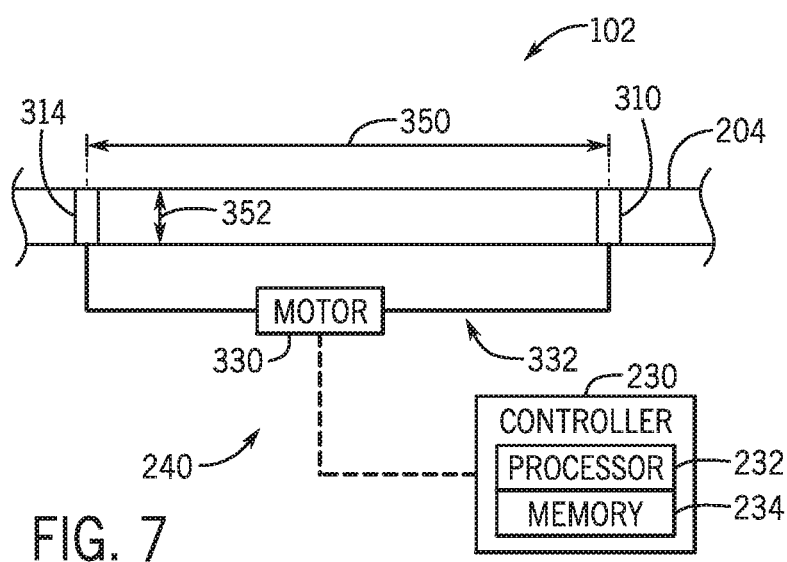
FIG. 7 is a schematic diagram of an embodiment of the fluid distribution system of FIG. 6, illustrating a feeder tube of the distributor in an elongated position, in accordance with an aspect of the present disclosure.

Indeed, FIG. 7 is a schematic diagram of one of the feeder tubes 204 of the fluid distribution system 102 of FIG. 6 in a stretched state. As shown, the feeder tube 204 in the stretched state has a stretched tube separation length 350 defined between the two clamps 310, 314 that may be longer than the un-stretched tube separation length 320 of the feeder tube 204 of FIG. 6 in the un-stretched state. Additionally, the feeder tube 204 in the stretched state may have a stretched tube diameter 352 that is less than the un-stretched tube diameter 322 of the feeder tube 204 of FIG. 6 in the un-stretched state. Due to the restricted diameter and/or the increased length of the feeder tube 204 in the stretched state, the refrigerant 104 may encounter an increased pressure drop resistance when flowing through the feeder tube 204 in the stretched state as compared to the feeder tube 204 in the un-stretched state. As such, a greater flow of the refrigerant 104 may be directed through other feeder tubes 204 of the distributor 200 having a relatively lower pressure drop compared to the feeder tube 204 in the stretched state. The fluid distribution system 102 may enable each feeder tube 204 of the distributor 200 to be individually adjusted to a target diameter and/or a target length, thereby controlling the flow of the refrigerant 104 through each feeder tube 204.

Moreover, although discussed herein as pertaining to adjustment of the feeder tube 204 in one linear dimension, it is to be understood that any suitable clamps and/or retaining elements, telescoping arms, and motors may be included to adjust the feeder tube 204 in two or more than two dimensions. Indeed, the flow of the refrigerant 104 within the feeder tube 204 may be also be selectively controlled by modifying a magnitude of a bend, curve, or kink in the feeder tube 204. In some embodiments, the feeder tube 204 may be manipulated between various geometry configurations, such as an S-shaped configuration, a U-shaped configuration, and so forth based on the desired fluid characteristics for the feeder tube 204.

Figure 8:
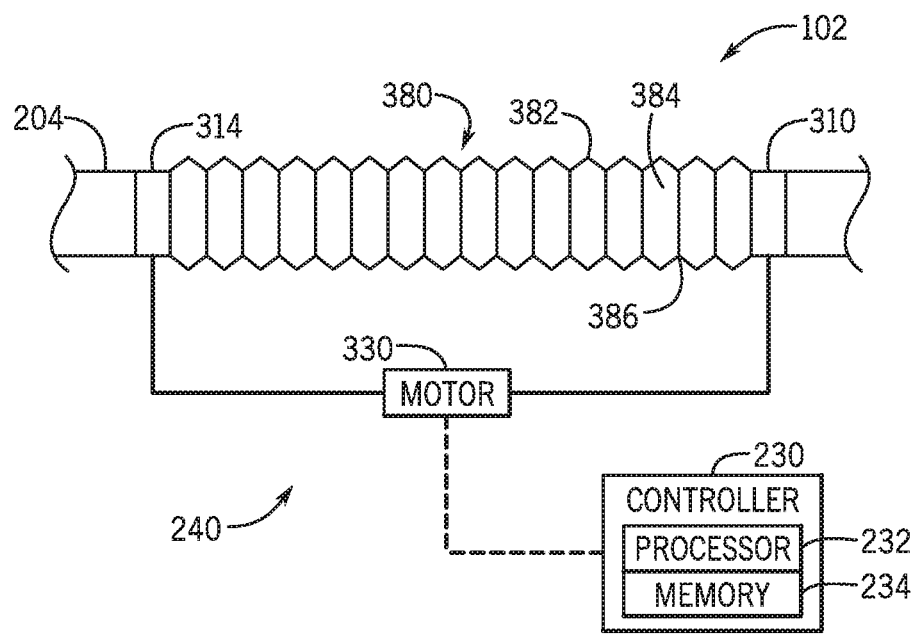
FIG. 8 is a schematic diagram of an embodiment of the fluid distribution system of FIG. 5 having a corrugated feeder tube, in accordance with an aspect of the present disclosure.

Looking to other examples of flexible feeder tubes 204, FIG. 8 is a schematic diagram of an embodiment of the fluid distribution system 102 having a feeder tube 204 with corrugated walls 380. For example, the corrugated walls 380 may include circumferential ridges 382 extending from an outer surface 384 of the feeder tube 204, which alternate with circumferential valleys 386 extending into the outer surface 384 of the feeder tube 204. As such, based on a compressive or expanding force the actuator 240 applies to the feeder tube 204 via the two clamps 310, 314, the corrugated walls 380 of the feeder tube 204 may expand or contract to modify the shape and/or the orientation of the feeder tube 204. Due to the flexibility of the feeder tube 204 provided by the selective compression or expansion of the circumferential ridges 382 and circumferential valleys 386 between the two clamps 310, 314, the feeder tube 204 may be formed of a plastic or rigid material, in some embodiments.

Figure 9:
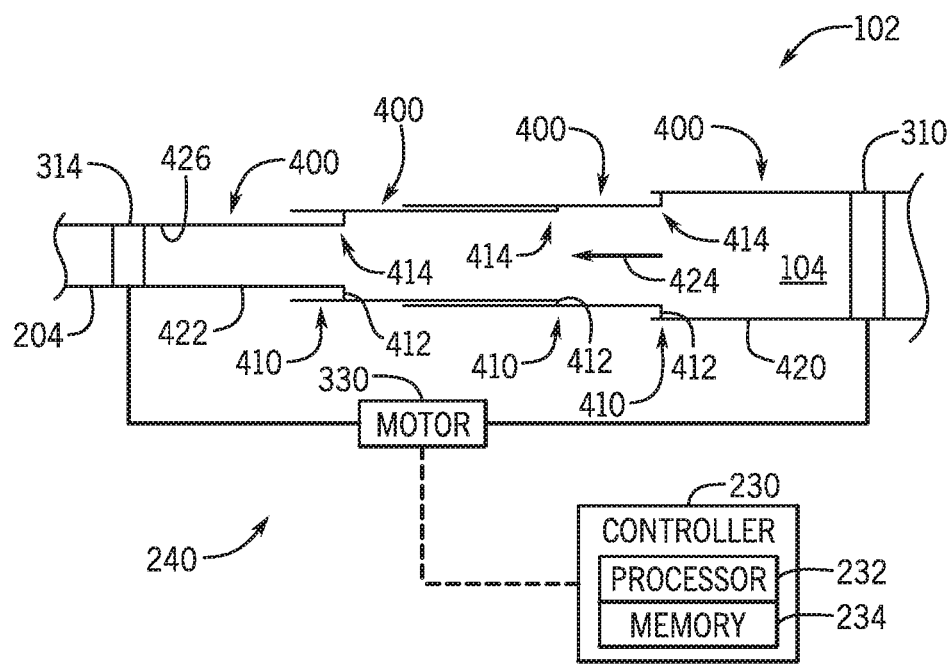
FIG. 9 is a schematic diagram of an embodiment of the fluid distribution system of FIG. 5 having a telescoping feeder tube, in accordance with an aspect of the present disclosure.

FIG. 9 is an embodiment of the feeder tube 204 of the fluid distribution system 102 formed from multiple telescoping tube portions 400. Accordingly, the feeder tube 204 may be expanded and/or contracted in length based on a number and a degree by which the telescoping tube portions 400 are nested within others of the telescoping tube portions 400. The telescoping tube portions 400 may incrementally increase in diameter relative to each other by a dimension that is a same or larger dimension than a thickness of a next telescoping tube portion 400, such that each telescoping tube portion 400 may be moved or received within an adjacent telescoping tube portion 400. In some embodiments, connections 410 between the adjacent telescoping tube portions 400 may be sealed by gaskets 412 or annular seals that are coupled to or formed on an end portion 414 of each telescoping tube portion 400 within the connections 410. As such, the feeder tube 204 may be selectively elongated or contracted in length based on actuation by the actuator 240 and controller 230, while maintaining a fluid-tight volume for directing the refrigerant 104 to the heat exchanger 62. Moreover, in some embodiments, the telescoping tube portions 400 may each be individually flexible, and the actuator 240 may be used to apply force to the feeder tube 204 in two or three dimensions, such that the feeder tube 204 may bend or flex to further adjust the orientation of the feeder tube 204 and the resulting refrigerant flow path within the feeder tube 204.

Although shown with the telescoping tube portions 400 oriented with a larger tube portion 420 disposed upstream of a smaller tube portion 422 relative to a flow direction 424 of the refrigerant 104 within the feeder tube 204, it is to be understood that the telescoping tube portions 400 may alternatively be arranged such that the larger tube portion 420 is downstream of the smaller tube portion 422 in some embodiments. The desired orientation may be selected based on a design consideration between a desired pressure drop and/or desired mixing or turbulence within the refrigerant 104 flowing through the feeder tube 204. For example, the illustrated orientation may have a reduced pressure drop compared to a reversed orientation having the larger tube portion 420 downstream of the smaller tube portion 422, but the reversed orientation may create more mixing or turbulence at an inner surface 426 of the feeder tube 204 to improve thermal distribution within the refrigerant 104.

Figure 10:
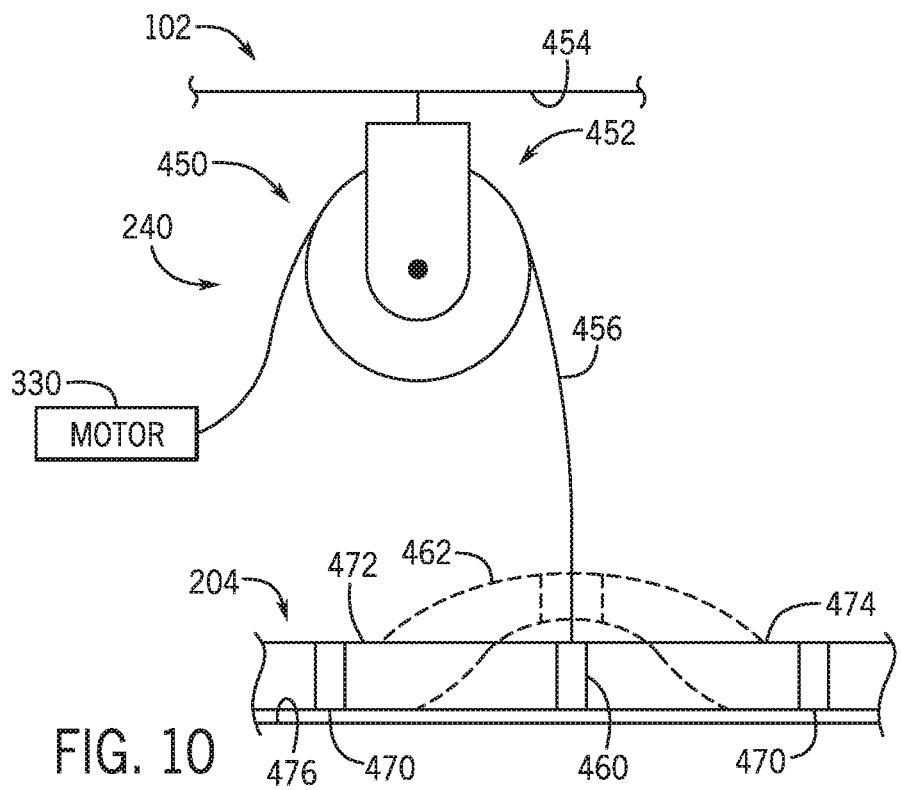
FIG. 10 is a schematic diagram of an embodiment of the fluid distribution system of FIG. 5 having a pulley-actuated feeder tube, in accordance with an aspect of the present disclosure.

FIG. 10 is a schematic embodiment of the fluid distribution system 102 having a pulley system 450 as part of the actuator 240 for actuating the feeder tube 204. The pulley system 450 may include a pulley 452 coupled to a surface 454, such as an inner surface of an air handling enclosure having the heat exchanger 99. The pulley system 450 may include any suitable drive link 456, such as a rope, a belt, a chain, or a cable, disposed around the pulley 452. In some embodiments, the drive link 456 may be coupled between the motor 330 and the feeder tube 204 of the fluid distribution system 102. The drive link 456 may be attached to the feeder tube 204 by any suitable retaining device 460 or feature, such as a clamp, a clip, a belt, and so forth. Accordingly, by instructing the actuator 240 to elongate or shorten the drive link 456, the pulley system 450 may apply force to the feeder tube 204 to modify the shape and/or orientation of the feeder tube 204. Indeed, as illustrated by dashed lines 462, the feeder tube 204 in the stretched state may include a raised portion having a lesser width and a longer length than the feeder tube 204 in the un-stretched state. In some embodiments, the fluid distribution system 102 may also include brackets or other retaining elements 470 that retain a first portion 472 and a second portion 474 of the feeder tube 204 in place against a retaining surface 476 to facilitate stretching of the feeder tube 204.

Figure 11:
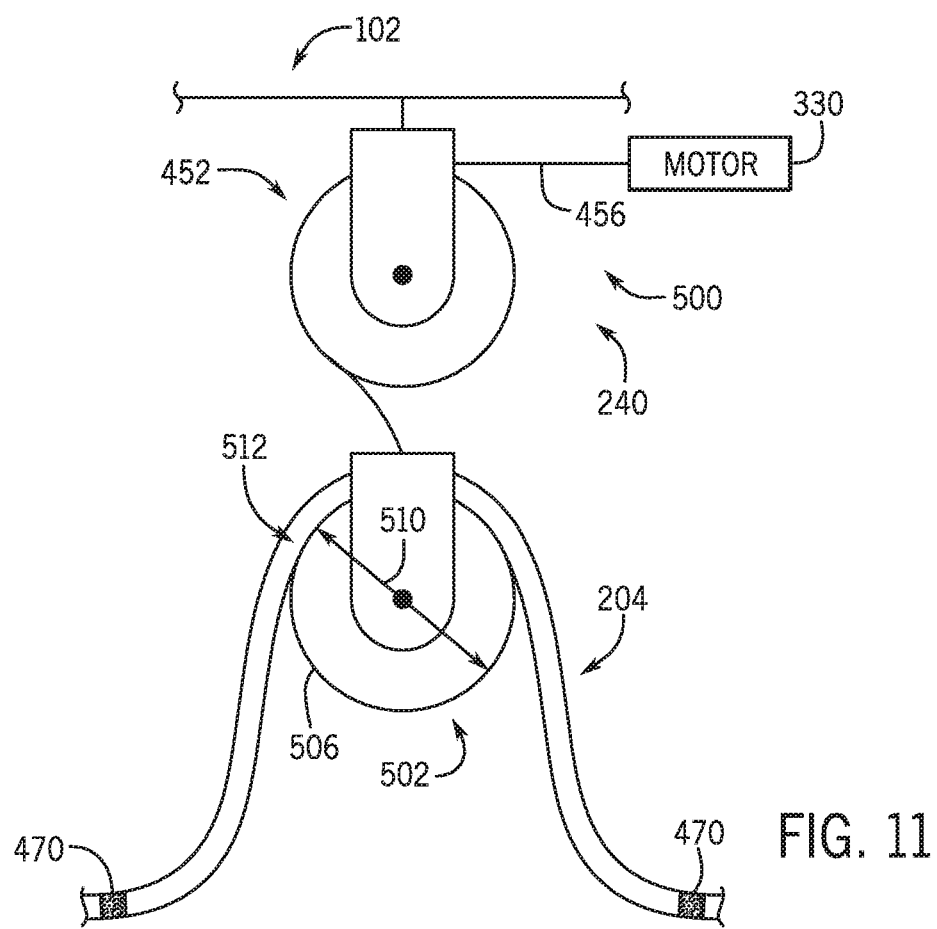
FIG. 11 is a schematic diagram of an embodiment of the fluid distribution system of FIG. 5 having a pulley-actuated feeder tube, in accordance with an aspect of the present disclosure.

FIG. 11 is another embodiment of a pulley system 500 of the fluid distribution system 102 for actuating the feeder tube 204. The pulley system 500 may operate in a manner similar to the operation of the pulley system 450 of FIG. 10. However, instead of adjusting the geometry of feeder tube 204 by actuating the drive link 456 coupled to the feeder tube 204, the pulley system 500 adjusts the geometry of the feeder tube 204 by adjusting a position or vertical position of a second pulley 502 coupled to the drive link 456. As such, the feeder tube 204 may be disposed along a surface 506 of the second pulley 502, which may have a diameter 510 suitable to form a smooth bend 512 within the feeder tube 204. Accordingly, by adjusting the drive link 456 disposed along the pulley 452 and coupled between the motor 330 and the second pulley 502, the fluid distribution system 102 enables the feeder tube 204 to be selectively elongated and/or shortened based on actuation of the drive link 456 by the motor 330. In some embodiments, each feeder tube 204 of the distributor 200 may be disposed along a respective pulley, or may be disposed along its own pulley system. It is to be understood that the pulley systems 450, 500 disclosed herein are illustrative examples of two of the multiple ways by which the feeder tubes 204 may be adjusted, and that the fluid distribution system 102 may be arranged in any other suitable manner that enables selective adjustment of the geometry of one or multiple feeder tubes 204.

Figure 12:
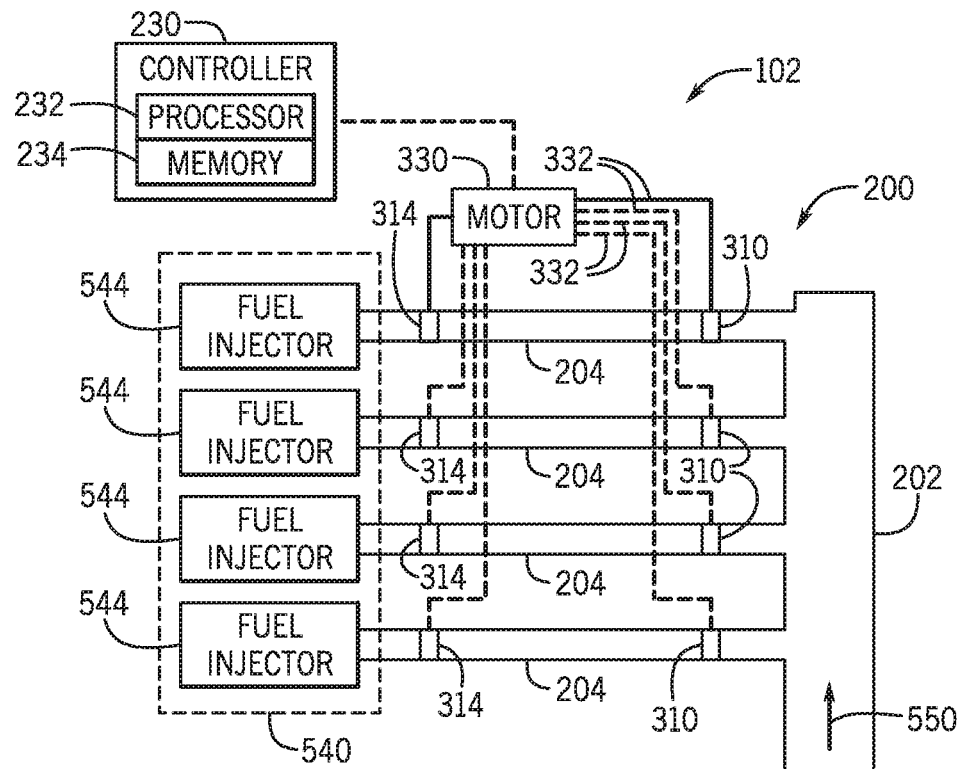
FIG. 12 is a schematic diagram of an embodiment of the fluid distribution system for a fuel supply system, in accordance with an aspect of the present disclosure.

FIG. 12 is an embodiment of the fluid distribution system 102 for supplying fluid to an engine 540. As shown, the fluid distribution system 102 includes the distributor 200 coupled between a fuel supply 542 and multiple fuel injectors 544 of the engine 540. As discussed above, the distributor 200 of the fluid distribution system 102 includes the main distributor tube 202 and the feeder tubes 204 coupled thereto. The feeder tubes 204 may include any suitably flexible material and/or arrangement. The fuel supply 542 may be a tank or reservoir having a fuel 550 therein. Additionally, the fuel injectors 544 may be any suitable devices for directing the fuel 550 into a combustion chamber or a portion of a combustion chamber of the engine 540.

Additionally, the fluid distribution system 102 includes the actuator 240 coupled to each feeder tube 204 to control a respective flow of the fuel 550 from the fuel supply 542, through each feeder tube 204, and into each fuel injector 544. For example, a respective first clamp 310, second clamp 314, and telescoping arm 332 are coupled to each feeder tube 204. Then, the motor 330 coupled to each second clamp 314 and each telescoping arm 332 may drive the clamps 310, 314 apart or together based on actuation of the motor 330 by the controller 230. In some embodiments, each telescoping arm 332 may be coupled to its own motor 330 and/or the geometry of the feeder tubes 204 may be manually adjusted. Additionally, in some embodiments, the controller 230 actuates the motor 330 to adjust the geometry of each feeder tube 204 based on an operating parameter of the engine 540 or the fluid distribution system 102, similar to the supply of the refrigerant 104 to the heat exchanger 99 discussed above.

Figure 13:
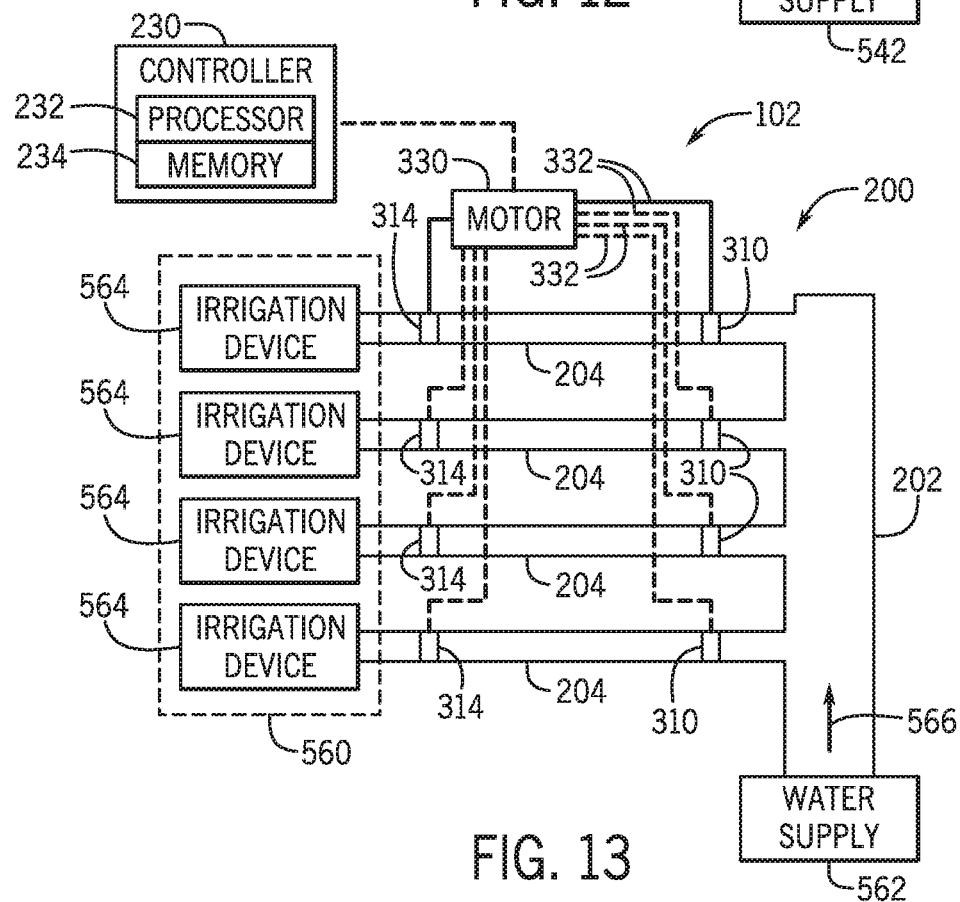
FIG. 13 is a schematic diagram of an embodiment of the fluid distribution system for an irrigation system, in accordance with an aspect of the present disclosure.

Moreover, FIG. 13 is an embodiment of the fluid distribution system 102 for supplying fluid to an irrigated field 560. That is, the fluid distribution system 102 includes the distributor 200 having the main distributor tube 202 and the feeder tubes 204 discussed above, which are coupled between a water supply 562 and multiple irrigation devices 564. The water supply 562 may be any suitable water source or reservoir for directing a flow of water 566 or water and agricultural additives, such as fertilizer, pesticide, and so forth, into the main distributor tube 202. The irrigation devices 564 may be any suitable fluid distribution devices, such as sprinklers, drip devices, and so forth.

The fluid distribution system 102 may include any of the feeder tubes 204 and/or actuators 240 discussed above with reference to the HVAC system 100. For example, the illustrated fluid distribution system 102 includes the clamps 310, 314, the telescoping arms 332, and the motor 330 communicatively coupled to the controller 230 of the fluid distribution system 102 discussed above with reference to FIG.

12. Accordingly, the fluid distribution system 102 may selectively modify the geometry of one or multiple feeder tubes 204 to direct target flows of the water 566 into each irrigation device 564. Indeed, in some embodiments, it may be desirable to direct more water 566 to one irrigation device 564 than another, based on the distance between the irrigation device 564 and the water supply 562, based on a plant or field by which the irrigation device 564 is disposed, and so forth.

Accordingly, the present disclosure is directed to a fluid distribution system for providing individualized flows of a fluid to one or multiple fluid receiving devices. The fluid distribution system may include any suitable actuator that may apply force to flexible feeder tubes of a distributor to adjust a geometry of the flexible feeder tubes. For example, the actuator of the fluid distribution system may include a first clamp coupled to a first portion of a feeder tube, a second clamp coupled to a second portion of the feeder tube, and a selectively telescoping arm or beam coupled between the clamps. The telescoping arm may be manipulated manually by a technician and/or mechanically by a motor of the actuator. The flexible distributor tubes may be made of a flexible material and/or formed in a flexible or stretchable shape, such as corrugations, telescoping tube portions, and so forth. By adjusting a geometry of one or multiple feeder tubes, a pressure drop through the feeder tubes may be modified to direct more or less refrigerant through each feeder tube. In some embodiments, a controller coupled to the actuator may receive feedback indicative of operating parameters of the fluid distribution system and/or the fluid receiving system to which the fluid is directed. Based on an operating parameter, the controller may automatically adjust the geometry of one or multiple feeder tubes to modify the flowrates of the fluid through each feeder tube.

Although examples are provided herein to illustrate how the fluid distribution system may be employed within the HVAC system, the engine, and the irrigation system, the fluid distribution system may be extended to modify geometries of any suitable flexible feeder tubes or flexible header manifold tubes in any other suitable fluid delivery systems, including industrial manufacturing, food production, medical fluid delivery, pipeline distributions, and so forth. Accordingly, the disclosed fluid distribution system may improve the distribution of fluid to any suitable fluid receiving system to reduce flow inequalities and improve an operating efficiency of the fluid receiving system.

While only certain features and embodiments of the present disclosure have been illustrated and described, many modifications and changes may occur to those skilled in the art, such as variations in sizes, dimensions, structures, shapes and proportions of the various elements, values of parameters, mounting arrangements, use of materials, colors, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the present disclosure. Furthermore, in an effort to provide a concise description of the exemplary embodiments, all features of an actual implementation may not have been described, such as those unrelated to the presently contemplated best mode of carrying out the present disclosure, or those unrelated to enabling the claimed disclosure. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A working fluid distribution system for a heating, ventilation, and/or air conditioning (HVAC) system, comprising:
   a distributor tube composed of a flexible material and configured to supply a working fluid to a component of an HVAC circuit of the HVAC system, wherein the distributor tube comprises corrugated walls having a plurality of circumferential ridges alternated with a plurality of circumferential valleys;
   an actuator coupled to the distributor tube and configured to be actuated to adjust a geometry of the distributor tube, wherein the actuator is configured to adjust the geometry of the distributor tube by increasing or decreasing a ridge width of the plurality of circumferential ridges and a valley width of the plurality of circumferential valleys; and
   a controller configured to instruct the actuator to adjust the geometry of the distributor tube based on an operating condition.

2. The working fluid distribution system of claim 1, wherein the actuator comprises a first clamp coupled to a first portion of the distributor tube, a second clamp coupled to a second portion of the distributor tube, a drive arm coupled between the first clamp and the second clamp, and a motor coupled to the drive arm, wherein the motor is configured to move the first clamp relative to the second clamp based on actuation by the controller.

3. The working fluid distribution system of claim 1, wherein the actuator comprises a motor and a pulley system, wherein the pulley system comprises:
   a pulley; and
   a drive link disposed on the pulley and coupled between the motor and the distributor tube, wherein the actuator is configured to adjust the geometry of the distributor tube by adjusting a length of the drive link to stretch or relax the distributor tube.

4. The working fluid distribution system of claim 1, wherein the operating condition comprises a fluid operating condition of the working fluid distribution system or a circuit operating condition of the HVAC circuit, and wherein the operating condition comprises a pressure drop, a pressure, a velocity, a temperature, or a combination thereof.

5. The working fluid distribution system of claim 1, wherein the controller is configured to instruct the actuator to adjust the geometry of the distributor tube in response to a determination that the operating condition is outside of an operating condition threshold.

6. The working fluid distribution system of claim 5, comprising a sensor communicatively coupled to the controller and fluidly coupled to the distributor tube, wherein the controller is configured to determine the operating condition based on feedback from the sensor.

7. The working fluid distribution system of claim 1, wherein the operating condition comprises a pressure drop of the working fluid, and wherein the controller is configured to instruct the actuator to increase a width and decrease a length of the distributor tube in response to a determination that the pressure drop of the working fluid is above a pressure drop threshold.

8. The working fluid distribution system of claim 1, wherein the operating condition comprises a pressure drop of the working fluid, and wherein the controller is configured to instruct the actuator to decrease a width and increase a length of the distributor tube in response to a determination that the pressure drop of the working fluid is below a pressure drop threshold.

9. The working fluid distribution system of claim 8, wherein the distributor tube is a first distributor tube, the pressure drop comprises a first pressure drop of the working fluid within the first distributor tube, and the pressure drop threshold comprises a range defined relative to a second pressure drop of the working fluid within a second distributor tube.

10. The working fluid distribution system of claim 1, wherein the distributor tube is a first distributor tube, the working fluid distribution system comprises a second distributor tube, and the controller is configured to instruct the actuator to adjust the geometry of the first distributor tube and/or adjust a geometry of the second distributor tube to equalize a first pressure drop of the working fluid within the first distributor tube with a second pressure drop of the working fluid within the second distributor tube.

11. The working fluid distribution system of claim 10, comprising a main distributor tube, wherein the first distributor tube and the second distributor tube are fluidly coupled to the main distributor tube in parallel with one another, and wherein the main distributor tube is configured to direct a first portion of the working fluid to the first distributor tube and a second portion of the working fluid to the second distributor tube.

12. The working fluid distribution system of claim 1, wherein the corrugated walls are composed of the flexible material, and wherein the actuator is configured to adjust the geometry of the distributor tube by stretching or relaxing the corrugated walls of the distributor tube to increase or decrease the ridge width of the plurality of circumferential ridges and the valley width of the plurality of circumferential valleys.

13. The working fluid distribution system of claim 1, wherein the plurality of circumferential ridges comprises a first diameter and the plurality of circumferential valleys comprises a second diameter, and wherein the first diameter is larger than the second diameter.

14. The working fluid distribution system of claim 1, wherein the controller is configured to instruct the actuator to modify the geometry of the distributor tube by increasing or decreasing a magnitude of a bend within the distributor tube.

15. A fluid distribution system, comprising:
a first flexible distributor tube configured to provide a first portion of a fluid receiving system with a first flow of a fluid, wherein the fluid is a refrigerant, the fluid receiving system comprises an evaporator, and the first portion of the fluid receiving system comprises a first refrigerant circuit of the evaporator;
a second flexible distributor tube configured to provide a second portion of the fluid receiving system with a second flow of the fluid, wherein the second portion of the fluid receiving system comprises a second refrigerant circuit of the evaporator;
an actuator system coupled to the first flexible distributor tube, wherein the actuator system is configured to be actuated to adjust a first geometry of the first flexible distributor tube, wherein the actuator system comprises a motor and a pulley system, and wherein the pulley system comprises:
a pulley; and
a drive link disposed on the pulley and coupled between the motor and the first flexible distributor tube, wherein the actuator system is configured to adjust the geometry of the first flexible distributor tube by adjusting a length of the drive link to stretch or relax the first flexible distributor tube; and
a controller configured to instruct the actuator system to adjust the first geometry of the first flexible distributor tube in response to a determination that an operating condition of the fluid distribution system or the fluid receiving system is beyond an operating condition threshold.

16. The fluid distribution system of claim 15, wherein the operating condition comprises a difference in a first pressure drop of the first flow of the fluid and a second pressure drop of the second flow of the fluid.

17. The fluid distribution system of claim 15, wherein the actuator system is configured to adjust the first geometry of the first flexible distributor tube to modify the first flow of the fluid to the first portion of the fluid receiving system.

18. The fluid distribution system of claim 15, wherein the actuator system is configured to be actuated to adjust a second geometry of the second flexible distributor tube, wherein the actuator system comprises a clamp actuator coupled to the second flexible distributor tube, the clamp actuator comprising:
a first clamp coupled to a first tube portion of the second flexible distributor tube;
a second clamp coupled to a second tube portion of the second flexible distributor tube, downstream of the first clamp relative to a flow direction of the second flow of the fluid;
a drive arm coupled between the first clamp and the second clamp; and
a clamp motor coupled to the drive arm and configured to move the first clamp relative to the second clamp, wherein the drive arm is configured to adjust a separation length between the first clamp and the second clamp to adjust the second geometry of the second flexible distributor tube based on actuation by the clamp motor.

19. A refrigerant distribution system for a heating, ventilation, and/or air conditioning (HVAC) system, comprising:
a distributor tube composed of a flexible material, wherein the distributor tube is configured to provide a flow of a refrigerant to a heat exchanger of the HVAC system;
an actuator coupled to the distributor tube and configured to be actuated to adjust a geometry of the distributor tube, and wherein the actuator comprises:
a first clamp coupled to a first portion of the distributor tube;
a second clamp coupled to a second portion of the distributor tube;
a drive arm coupled between the first clamp and the second clamp;
a motor coupled to the drive arm and configured to move the first clamp relative to the second clamp; and
a controller configured to instruct the actuator to adjust the geometry of the distributor tube based on an operating condition of the HVAC system.

20. The refrigerant distribution system of claim 19, wherein the heat exchanger comprises a refrigerant circuit, and wherein the distributor tube is configured to direct the flow of the refrigerant into the refrigerant circuit.

21. The refrigerant distribution system of claim 19, wherein the operating condition comprises a pressure drop of the refrigerant, a pressure of the refrigerant, a flow rate of the refrigerant, a temperature of the refrigerant, or a combination thereof, and wherein the controller is configured to instruct the actuator to adjust the geometry of the distributor tube in response to a determination that the operating condition is beyond an operating condition threshold.

22. The refrigerant distribution system of claim 19, wherein the distributor tube is a first distributor tube, the geometry is a first geometry, and the actuator is a first actuator, and wherein the refrigerant distribution system comprises:
- a second distributor tube composed of the flexible material, wherein the second distributor tube is configured to receive the flow of the refrigerant from the heat exchanger; and
- a second actuator coupled to the second distributor tube, wherein the controller is configured to instruct the second actuator to adjust a second geometry of the second distributor tube based on the operating condition of the HVAC system.

* * * * *